United States Patent
Zhang et al.

(10) Patent No.: US 10,054,269 B2
(45) Date of Patent: Aug. 21, 2018

(54) DIRECT-TYPE BACKLIGHT OPTICAL SIMULATION DEVICE AND SYSTEM

(71) Applicants: BOE TECHNOLOGY GROUP CO., LTD., Beijing (CN); BEIJING BOE DISPLAY TECHNOLOGY CO., LTD., Beijing (CN)

(72) Inventors: Wei Zhang, Beijing (CN); Yu Zhang, Beijing (CN); Hao Zhou, Beijing (CN); Yanping Liao, Beijing (CN); Weihao Hu, Beijing (CN); Hai Chi, Beijing (CN); Wei Zhong, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/542,377

(22) PCT Filed: May 20, 2016

(86) PCT No.: PCT/CN2016/082834
§ 371 (c)(1),
(2) Date: Jul. 7, 2017

(87) PCT Pub. No.: WO2017/152501
PCT Pub. Date: Sep. 14, 2017

(65) Prior Publication Data
US 2018/0066805 A1    Mar. 8, 2018

(30) Foreign Application Priority Data

Mar. 10, 2016    (CN) .................. 2016 2 0183553 U

(51) Int. Cl.
*F21V 21/14*    (2006.01)
*F21K 9/20*    (2016.01)
(Continued)

(52) U.S. Cl.
CPC .................. *F21K 9/20* (2016.08); *F21K 9/68* (2016.08); *F21V 21/14* (2013.01); *G02B 5/0278* (2013.01); *G02F 1/133602* (2013.01)

(58) Field of Classification Search
CPC ... F21K 9/20; F21K 9/68; F21V 21/14; G02B 5/0278; G02F 1/133602; G02F 1/133603;
(Continued)

(56) References Cited

U.S. PATENT DOCUMENTS 9,213,132 B2    12/2015   Jung et al.
2009/0002988 A1*    1/2009   Kim .................. G02F 1/133603
362/247
(Continued)

FOREIGN PATENT DOCUMENTS

CN    201322275 Y    10/2009
CN    102855826 A    1/2013
(Continued)

OTHER PUBLICATIONS

International Search Report and Written Opinion for International Application No. PCT/CN2016/082834 dated Nov. 10, 2016.

*Primary Examiner* — Hargobind S Sawhney
(74) *Attorney, Agent, or Firm* — Calfee, Halter & Griswold LLP

(57) ABSTRACT

A direct-type backlight optical simulation apparatus and system are provided. The apparatus includes a diffusion plate, a supporting plate for the diffusion plate, an MF device and a platform, a side wall and a supporting rack for the diffusion plate are formed around the platform, and the platform includes slides, a reflection sheet and a plurality of first guide rails arranged to be parallel to each other. The MF device includes an MF fixing device, an MF reflection plate and an MF angle adjustment device. The MF reflection plate is coupled with the MF fixing device by the MF angle (Continued)

adjustment device, and the MF device is fixed on the side walls of the platform by the MF fixing device.

14 Claims, 4 Drawing Sheets

(51) Int. Cl.
*F21K 9/68* (2016.01)
*G02B 5/02* (2006.01)
*G02F 1/1335* (2006.01)

(58) Field of Classification Search
CPC ......... G02F 1/133605; G02F 1/133606; G02F 1/133608; G02F 1/133611
See application file for complete search history.

(56) References Cited

U.S. PATENT DOCUMENTS

2012/0087110 A1* 4/2012 Lee ................... G02B 6/009
362/97.3
2015/0098231 A1* 4/2015 Chou ................. F21V 21/14
362/418
2016/0266419 A1* 9/2016 Li ...................... G02F 1/1309

FOREIGN PATENT DOCUMENTS

| CN | 103672626 A | 3/2014 |
| CN | 203534796 U | 4/2014 |
| CN | 203551904 U | 4/2014 |
| CN | 203705748 U | 7/2014 |

* cited by examiner

US 10,054,269 B2

DIRECT-TYPE BACKLIGHT OPTICAL SIMULATION DEVICE AND SYSTEM

CROSS-REFERENCE TO RELATED APPLICATIONS

The present application is based upon International Application No. PCT/CN2016/082834, filed on May 20, 2016, which is based upon and claims priority to Chinese Patent Application No. 201620183553.X, filed Mar. 10, 2016, the entire contents of which are incorporated herein by reference.

TECHNICAL FIELD

The present disclosure relates to the field of optical simulation, and more particularly to a direct-type backlight optical simulation apparatus and system.

BACKGROUND

Currently, the optical scheme of the direct-type backlight is mainly composed of the following steps: first performing software simulation on optical characteristics of a product according to the characteristics of the product; after confirming the optical scheme, drawing a design of an LED bar by the backlight manufacturer, wherein drawing the design is expected to take two weeks; and producing a mockup sample by using a back light unit (BLU), which takes at least two weeks and costs more than RMB 10,000. If there is an error in the optical scheme, it is necessary to repeat the step of drawing the design. In this case, the develop cycle is long, and the cost is higher.

It should be noted that, information disclosed in the above background portion is provided only for better understanding of the background of the present disclosure, and thus it may contain information that does not form the prior art known by those skilled in the art.

SUMMARY

According to an aspect of the present disclosure, a direct-type backlight optical simulation apparatus is provided. The direct-type backlight optical simulation apparatus includes a diffusion plate, a supporting plate for the diffusion plate, an MF device and a platform. A side wall and a supporting rack for the diffusion plate are formed around the platform, and the platform includes slides, a reflection sheet and a plurality of first guide rails arranged to be parallel to each other, wherein the slides are formed on two side walls of the platform which are opposite to each other, two ends of each of the first guide rails are positioned on the slides, respectively, the reflection sheet is located on a side of the first guide rails near the platform, and a plurality of LED clamps capable of sliding along a lengthwise direction of the first guide rails are provided on the first guide rails, the supporting plate for the diffusion plate has an end movably coupled to the supporting rack for the diffusion plate, and the other end of the supporting plate for the diffusion plate supports the diffusion plate, the MF device comprises an MF fixing device, an MF reflection plate and an MF angle adjustment device, the MF reflection plate is coupled with the MF fixing device by the MF angle adjustment device, and the MF device is fixed on the side walls of the platform by the MF fixing device.

According to another aspect of the present disclosure, a direct-type backlight optical simulation system is also provided, which includes the direct-type backlight optical simulation apparatus described as above and a power supply.

It is to be understood that both the foregoing general description and the following detailed description are exemplary and explanatory only and are not restrictive of the invention, as claimed.

This section provides a summary of various implementations or examples of the technology described in the disclosure, and is not a comprehensive disclosure of the full scope or all features of the disclosed technology.

BRIEF DESCRIPTION OF THE DRAWINGS

In order to more clearly illustrate the technical solutions in embodiments of the present invention, the drawings of the embodiments will be briefly introduced below. Apparently, the drawings in the following description are only for some embodiments of the present disclosure, and not intended to limit the present disclosure.

DETAILED DESCRIPTION

In order to that the objects, technical solutions and advantages of the embodiments of the present disclosure become more clear, the technical solutions in the embodiments of the present disclosure will be described in conjunction with the accompanying drawings in the embodiments of the present disclosure. It will be apparent that the described embodiments are merely a part of the embodiments of the present disclosure, and not all embodiments. All other embodiments obtained by those of ordinary skill in the art based on embodiments of the disclosure without making creative work are within the scope of the present disclosure.

In the description of the present disclosure, it is to be noted that the orientation or position relations indicated by the terms "upper", "lower", "top", "bottom" and the like are orientation or position relations based on the drawings. They are only used for facilitating and simplifying the description of the present disclosure, rather than indicating or implying that the indicated devices or elements must have a specific orientation and are constructed and operated in a specific orientation, and therefore cannot be construed as limiting the present disclosure.

Further, in the description of the present disclosure, the meaning of "a plurality of" is two or more, unless otherwise stated.

According to an embodiment of the present disclosure, a direct-type backlight optical simulation apparatus is provided. The direct-type backlight optical simulation apparatus includes a diffusion plate, a supporting plate for the diffusion plate, a mold frame (MF) device, and a platform. A side wall and a supporting rack for the diffusion plate are formed around the platform, and the platform includes slides, a reflection sheet and a plurality of first guide rails arranged to be parallel to each other. The slides are formed on two side walls of the platform which are opposite to each other. Two ends of each of the first guide rails are positioned on the slides, and the reflection sheet is located on a side of the first guide rails near the platform. A plurality of LED clamps capable of sliding along a lengthwise direction of the first guide rails are provided on the first guide rails, and the supporting plate for the diffusion plate has an end which is movably coupled to the supporting rack for the diffusion plate, and the other end of the supporting plate for the diffusion plate supports the diffusion plate. The MF device includes an MF fixing device, an MF reflection plate and an MF angle adjustment device. The MF reflection plate is coupled with the MF fixing device by the MF angle adjustment device, and the MF device is fixed on the side walls of the platform by the MF fixing device.

Hereinafter, a direct-type backlight optical simulation apparatus according to an embodiment of the present disclosure is described with reference to a platform having for example a rectangular shape.

Figure 1:
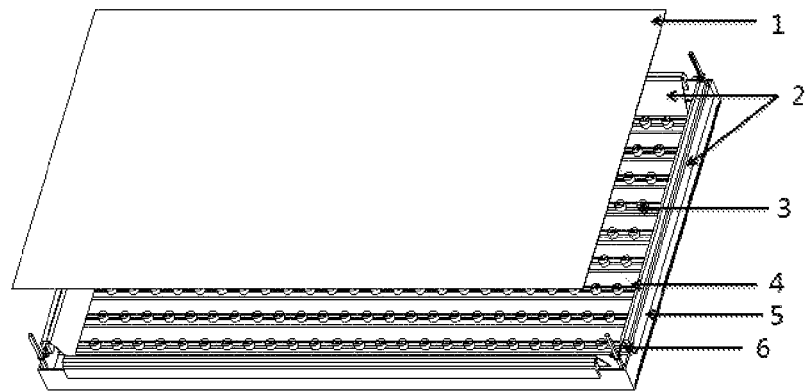
FIG. 1 is an overall structural schematic diagram of a direct-type backlight optical simulation apparatus according to an exemplary embodiment of the present disclosure.

As shown in FIG. 1, according to an exemplary embodiment of the present disclosure, a direct-type backlight optical simulation apparatus is provided, which includes a diffusion plate 1, a supporting plate 7 for the diffusion plate, an MF device 2 and a platform 5. Side walls are formed around the platform 5, and a supporting rack 6 for the diffusion plate is formed at each of four corners of the platform 5. A slide, a reflection sheet and a plurality of parallel first guide rails 3 are formed on the platform 5. In particular, the left and right side walls of the platform 5 are formed with slides, and two ends of each of the plurality of parallel first guide rails 3 are positioned on the slides at two sides, such that the plurality of first guide rails 3 can slide on the slides along a first direction (for example, longitudinal direction). The reflection sheet (not shown) is located under the first guide rails 3, in order to reflect light to the diffusion plate, thereby enhancing the utilization of light. A plurality of LED clamps 4 capable of sliding on each of the first guide rails 3 along a second direction (for example, horizontal direction) are disposed on the first guide rail 3, and the supporting plate 7 for the diffusion plate has an end which is movably coupled to a supporting rack 6 for the diffusion plate, and the other end which supports one corner of the diffusion plate 1, such that the supporting plate 7 for the diffusion plate may be moved up and down along the supporting rack 6 for the diffusion plate. The MF device is fixed on side walls of the platform. According to an embodiment of the present disclosure, the MF device includes an MF fixing device, an MF reflection plate and an MF angle adjustment device. The MF reflection plate is coupled with the MF fixing device by the MF angle adjustment device, and the MF device is fixed on the side walls of the platform by the MF fixing device. It is to be noted that, according to an embodiment of the present disclosure, there may be a plurality of (for example, four) supporting plates 7 for the diffusion plate and a plurality of (for example, four) supporting racks 6 for the diffusion plate. Therefore, the direct-type backlight optical simulation apparatus and system provided by an exemplary embodiment of the present disclosure may respectively adjust a distance from the diffusion plate to the reflection sheet (i.e., OD value), a distance between LEDs (i.e., LED pitch), and a tilt angle of the MF reflection plate, which can truly simulate an optical scheme, and can save the development cycle and a lot of costs without the need for drawing a design of an LED bar and also without the need for producing a mockup.

In an exemplary embodiment, the area of a side (i.e. upper side) of the platform 5 towards the diffusion plate 1 may be 55-65 square inches.

Figure 2:
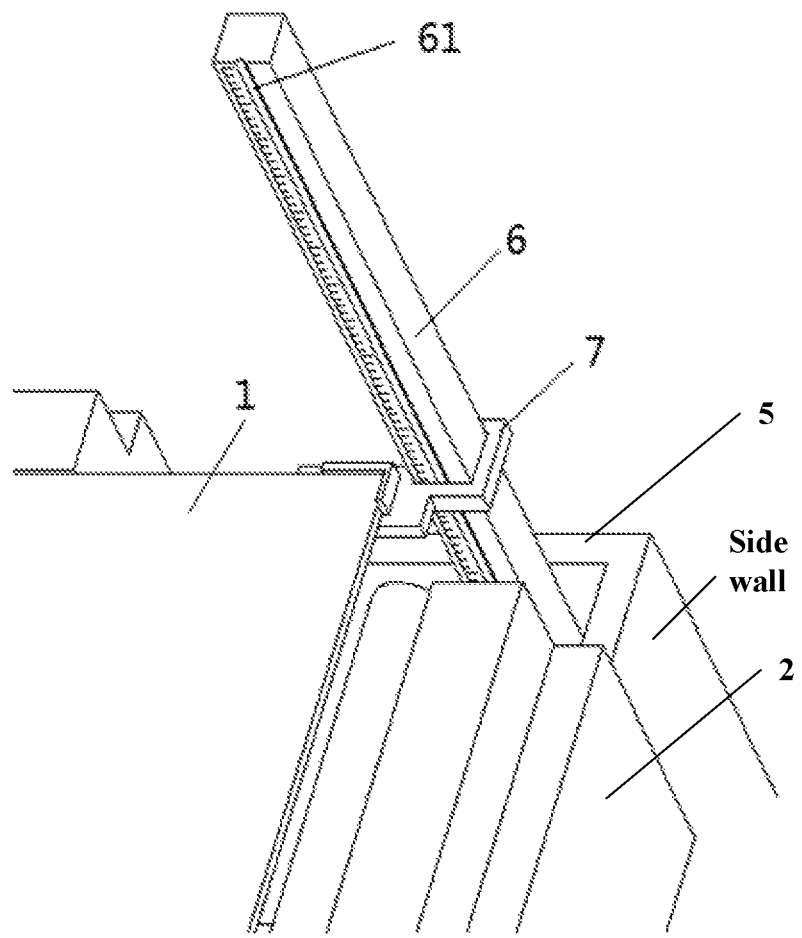
FIG. 2 is a partial schematic diagram when combining a diffusion plate, a supporting plate for the diffusion plate and a supporting rack for the diffusion plate of a direct-type backlight optical simulation apparatus according to an exemplary embodiment of the present disclosure.

As shown in FIG. 2, according to an exemplary embodiment of the present disclosure, a second guide rail 61 having a first scale is formed on at least one side of the supporting rack 6 for the diffusion plate, such that a distance of a mixed light can be accurately adjusted. Also, the supporting plate 7 for the diffusion plate has an end which is muff-coupled to the supporting rack 6 for the diffusion plate, and the supporting plate 7 for the diffusion plate is provided with a supporting portion which mates with a shape of one corner of the diffusion plate 1 to prevent the diffusion plate 1 from sliding on the supporting plate 7 for the diffusion plate.

Figure 3:
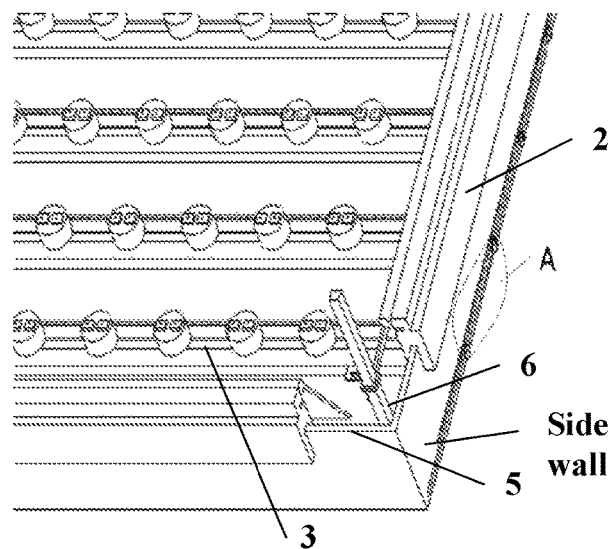
FIG. 3 is a partial structural schematic diagram of a direct-type backlight optical simulation apparatus having scales according to an exemplary embodiment of the present disclosure.
Figure 5:
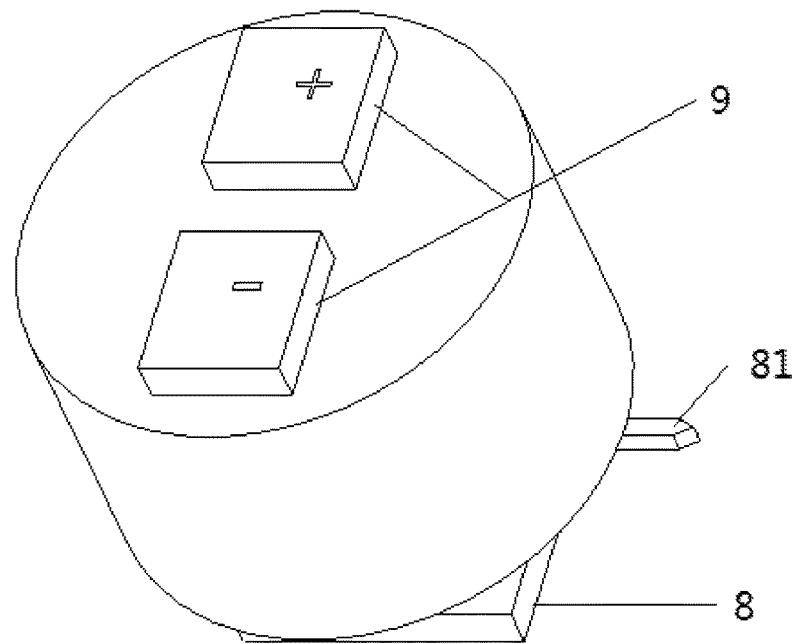
FIG. 5 is a structural schematic diagram of an LED clamp according to an exemplary embodiment of the present disclosure.

According to an exemplary embodiment of the present disclosure, as shown in FIG. 3, the first guide rail 3 has a second scale along a second direction (for example, horizontal direction), and as shown in FIG. 5, the LED clamp 4 is provides with a first pointer 81 pointed to the second scale, such that the position of the LED can be accurately adjusted along the second direction.

Figure 4:
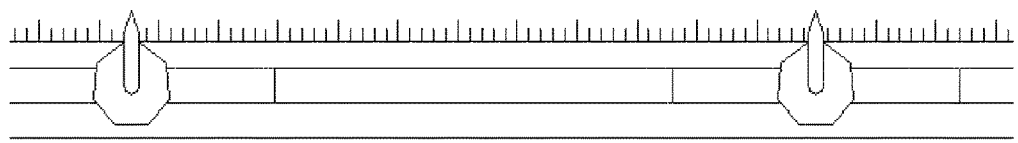
FIG. 4 is a partial enlarged diagram of a portion "A" in FIG. 3.

According to an exemplary embodiment of the present disclosure, as shown in FIG. 3, the platform 5 has a third scale along the first direction (for example, longitudinal direction) on at least one side thereof perpendicular to the first guide rail 3. Also, it can be seen from FIG. 4 that, the first guide rail 3 has at least one end which is provided with a second pointer pointed to the third scale, such that the position of the LED can be accurately adjusted along the first direction. Therefore, according to an embodiment of the present disclosure, the LED clamp 4 disposed on the first guide rail 3 can not only slide in the first direction, but also can move in the second direction, such that a distance between LEDs may be precisely adjusted.

According to an exemplary embodiment of the present disclosure, as shown in FIG. 5, the LED clamp 4 is provided with a guide slider 8 at a bottom thereof, and provided with positive and negative electrodes 9 at a top thereof, such that a voltage and a current may be effectively provided to the LED. The guide slider 8 is provided in a groove of the first guide rail 3, and may slide along the first guide rail 3 in the second direction (for example, horizontal direction).

Figure 6:
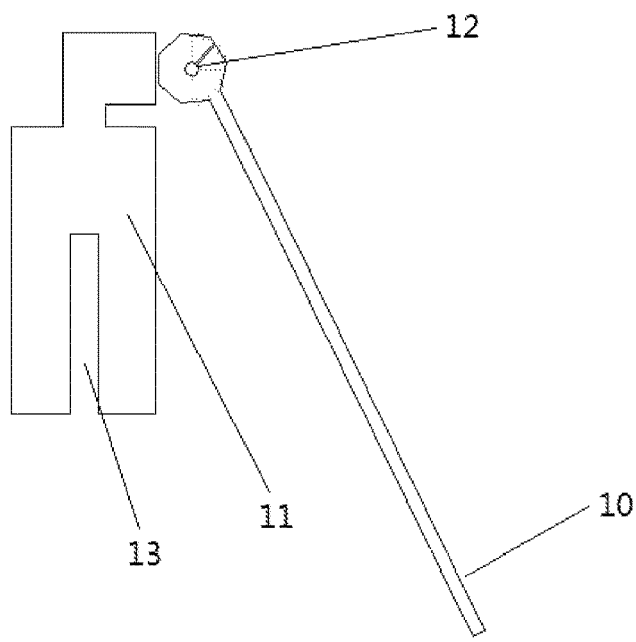
FIG. 6 is a structural schematic diagram of an MF device according to an exemplary embodiment of the present disclosure.
Figure 7:
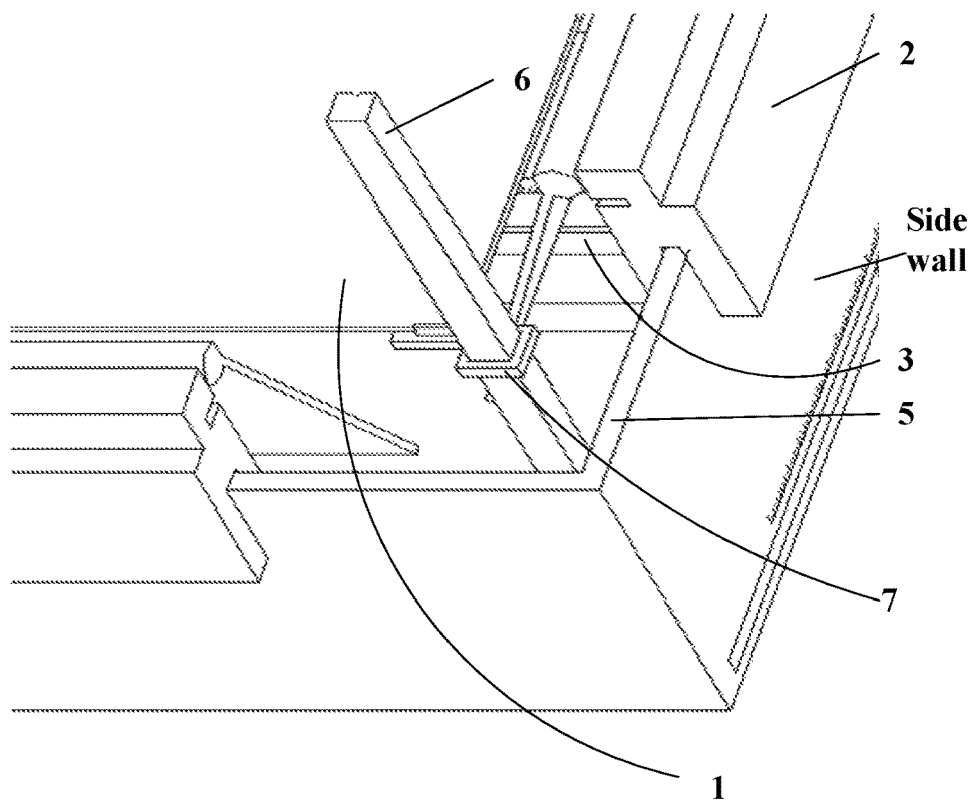
FIG. 7 is a partial structural schematic diagram of a direct-type backlight optical simulation apparatus when an MF device is fixed on a side wall of a platform according to an exemplary embodiment of the present disclosure.

As shown in FIG. 6, according to an exemplary embodiment of the present disclosure, the MF device 2 includes an MF fixing device 11, an MF reflection plate 10 and an MF angle adjustment device 12. The MF reflection plate 10 is coupled with the MF fixing device 11 by the MF angle adjustment device 12. Further, the MF fixing device 11 includes an MF holding slot 13. As shown in FIG. 7, the MF device 2 may be clamped with the side wall of the platform 5 by the MF holding slot 13. According to an embodiment of the present disclosure, by using the MF device 2, the adjustment of the tilt angle of the MF reflection plate 10 may be achieved. It will be readily apparent to those skilled in the art that the way for coupling the MF device 2 with the side wall of the platform 5 is not limited herein.

In an exemplary embodiment, a height adjustment device is disposed between the MF holding slot 13 and the side wall of the platform 5 to adjust the overall height of the MF device. For example, a spacer may be provided between the MF holding slot 13 and an upper surface of the side wall of the platform 5.

In an exemplary embodiment, the MF angle adjustment device 12 is an MF rotating shaft that rotates around a radial direction of the MF device (for example, the radial direction of the MF devices at left and right sides is the longitudinal direction, and the radial direction of the MF devices at upper and lower sides is the horizontal direction).

In an exemplary embodiment, the MF rotating shaft has a fourth scale (for example, angles) on at least one side thereof, such that the angle between the MF reflection plate 10 and the MF fixing device 11 may be accurately controlled.

In an exemplary embodiment, the MF reflection plate 10 may be made by a reflective flexible material to adjust a length of the MF reflection plate 10. For example, the MF reflection plate 10 may be rolled up with the MF rotating shaft to adjust its length, and light reflection may be increased to improve the utilization of light. In another embodiment, it is also possible to provide a rotating shaft at the other end of the MF reflection plate 10 with respect to the MF angle adjustment device 12, and the extension of the MF reflection plate 10 is achieved through the rotation of the rotating shaft, that is, the adjustment of the length of the MF reflection plate 10 is achieved.

Figure 8:
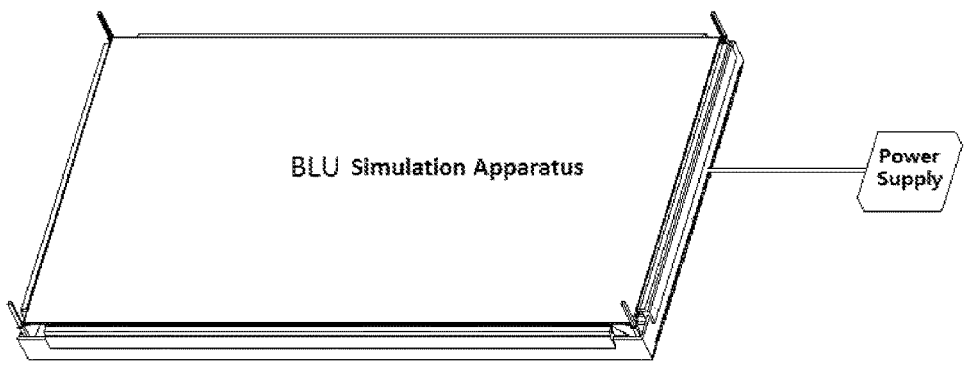
FIG. 8 is a structural schematic diagram of a direct-type backlight optical simulation system according to an exemplary embodiment of the present disclosure.

According to another exemplary embodiment of the present disclosure, as shown in FIG. 8, a direct-type backlight optical simulation system including the direct-type backlight optical simulation apparatus 100 described as above and a power supply 200 is provided, wherein the power supply may adjust a voltage and a current as needed.

It is to be noted that the above-described exemplary embodiments are merely illustrative and not limiting of the present disclosure. In some cases, the first direction may be a horizontal direction, and the second direction may be a longitudinal direction.

The above description is only specific implementations of the present disclosure, but the scope of the present disclosure is not limited thereto. Changes or replacements within the technical scope of the present disclosure, which can be easily acquired by those skilled in the art, should be encompassed within the scope of the present disclosure. Accordingly, the scope of the present disclosure should be based on the scope of the claims attached.

What is claimed is:

1. A direct-type backlight optical simulation apparatus comprising: a diffusion plate, a supporting plate for the diffusion plate, a mold frame (MF) device and a platform, wherein a side wall and a supporting rack for the diffusion plate are formed around the platform, and the platform comprises slides, a reflection sheet and a plurality of first guide rails arranged to be parallel to each other, wherein the slides are formed on two side walls of the platform which are opposite to each other, respectively, two ends of each of the first guide rails are positioned on the slides, respectively, the reflection sheet is located on a side of the first guide rails near the platform, and a plurality of LED clamps capable of sliding along a lengthwise direction of the first guide rails are provided on the first guide rails, wherein the supporting plate for the diffusion plate has an end movably coupled to the supporting rack for the diffusion plate, and the other end of the supporting plate for the diffusion plate supports the diffusion plate, wherein the MF device comprises an MF fixing device, an MF reflection plate and an MF angle adjustment device, the MF reflection plate is coupled with the MF fixing device by the MF angle adjustment device, and the MF device is fixed on the side walls of the platform by the MF fixing device.

2. The direct-type backlight optical simulation apparatus of claim 1, wherein a second guide rail having a first scale is formed on the supporting rack for the diffusion plate, and a lengthwise direction of the second guide rail is perpendicular to an upper surface of the platform.

3. The direct-type backlight optical simulation apparatus of claim 1, wherein each of the first guide rails has a second scale along a lengthwise direction of the first guide rails, and each of the LED clamps is provided with a first pointer pointed to the second scale.

4. The direct-type backlight optical simulation apparatus of claim 1, wherein one of the slides on at least one side has a third scale along an extending direction of the slides, and at least one end of each of the first guide rails is provided with a second pointer pointed to the third scale.

5. The direct-type backlight optical simulation apparatus of claim 1, wherein the supporting plate for the diffusion plate has an end movably coupled with the supporting rack for the diffusion plate in a way that the end of the supporting plate for the diffusion plate is muff-coupled to the supporting rack for the diffusion plate.

6. The direct-type backlight optical simulation apparatus of claim 1, wherein the supporting plate for the diffusion plate is provided with a supporting portion which mates with the diffusion plate.

7. The direct-type backlight optical simulation apparatus of claim 1, wherein each of the LED clamps is provided with a guide slider at a bottom thereof, and each of the LED clamps is provided with positive and negative electrodes at a top thereof.

8. The direct-type backlight optical simulation apparatus of claim 1, wherein the MF fixing device comprises an MF holding slot, and the MF device is fixed on the side wall of the platform by the MF fixing device in a way that the MF device is clamped with the side wall of the platform by the MF holding slot.

9. The direct-type backlight optical simulation apparatus of claim 8, wherein a spacer is provided between the MF holding slot and the side wall of the platform.

10. The direct-type backlight optical simulation apparatus of claim 1, wherein the MF angle adjustment device is an MF rotating shaft rotates around a radial direction of the MF device.

11. The direct-type backlight optical simulation apparatus of claim 10, wherein the MF rotating shaft has a fourth scale.

12. The direct-type backlight optical simulation apparatus of claim 1, wherein the MF reflection plate is made of a reflective flexible material.

13. The direct-type backlight optical simulation apparatus of claim 1, wherein the platform has a rectangle shape or a square shape, and the supporting rack for the diffusion plate is disposed at each of four corners of the platform.

14. A direct-type backlight optical simulation system comprising: a direct-type backlight optical simulation apparatus and a power supply, wherein the direct-type backlight optical simulation apparatus comprises a diffusion plate, a supporting plate for the diffusion plate, a mold frame (MF) device and a platform, wherein a side wall and a supporting rack for the diffusion plate are formed around the platform, and the platform comprises slides, a reflection sheet and a plurality of first guide rails arranged to be parallel to each other, wherein the slides are formed on two side walls of the platform which are opposite to each other, respectively, two ends of each of the first guide rails are positioned on the slides, respectively, the reflection sheet is located on a side of the first guide rails near the platform, and a plurality of LED clamps capable of sliding along a lengthwise direction of the first guide rails are provided on the first guide rails, wherein the supporting plate for the diffusion plate has an end movably coupled to the supporting rack for the diffusion plate, and the other end of the supporting plate for the diffusion plate supports the diffusion plate, wherein the MF device comprises an MF fixing device, an MF reflection plate and an MF angle adjustment device, the MF reflection plate is coupled with the MF fixing device by the MF angle adjustment device, and the MF device is fixed on the side walls of the platform by the MF fixing device.

\* \* \* \* \*